United States Patent
Wolf et al.

(10) Patent No.: US 10,012,767 B2
(45) Date of Patent: *Jul. 3, 2018

(54) DISDROMETER HAVING ACOUSTIC TRANSDUCER AND METHODS THEREOF

(71) Applicant: Arable Labs, Inc., Princeton, NJ (US)

(72) Inventors: Lawrence Adam Wolf, Princeton, NJ (US); Benjamin Joseph Siegfried, Oakland, CA (US); Adam Lee Smith, Seattle, WA (US)

(73) Assignee: Arable Labs, Inc., Princeton, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/805,202

(22) Filed: Nov. 7, 2017

(65) Prior Publication Data
US 2018/0059287 A1  Mar. 1, 2018

Related U.S. Application Data

(63) Continuation of application No. 15/452,457, filed on Mar. 7, 2017, now Pat. No. 9,841,533.

(60) Provisional application No. 62/305,211, filed on Mar. 8, 2016.

(51) Int. Cl.
  *G01W 1/00* (2006.01)
  *G01W 1/14* (2006.01)

(52) U.S. Cl.
  CPC ..................... *G01W 1/14* (2013.01)

(58) Field of Classification Search
  None
  See application file for complete search history.

(56) References Cited

U.S. PATENT DOCUMENTS

| | | | | |
|---|---|---|---|---|
| 5,125,268 A | * | 6/1992 | Caron | G01W 1/14 340/602 |
| 5,528,224 A | * | 6/1996 | Wang | G01W 1/14 250/573 |
| 6,856,273 B1 | * | 2/2005 | Bognar | G01F 1/66 342/26 D |
| 7,249,502 B2 | | 7/2007 | Luukkala et al. | |
| D686,929 S | | 7/2013 | Rainer et al. | |
| 8,714,007 B2 | | 5/2014 | Cullen et al. | |
| 8,891,895 B2 | | 11/2014 | Garrett et al. | |
| 9,037,521 B1 | | 5/2015 | Mewes et al. | |

(Continued)

FOREIGN PATENT DOCUMENTS

| | | |
|---|---|---|
| CN | 202975367 U | 6/2013 |
| GB | 2412735 A | 10/2005 |

(Continued)

OTHER PUBLICATIONS

Thomas et al., "Field testing of a powdery mildew disease forecast model on grapes in California", Phytopathology, 1994, 84,1070.

(Continued)

*Primary Examiner* — Andre Allen
(74) *Attorney, Agent, or Firm* — Ulmer & Berne LLP

(57) ABSTRACT

An acoustic disdrometer is provided for measuring precipitation. The acoustic disdrometer has an acoustic transducer positioned within an acoustic chamber defined by an acoustic shell. Precipitation impacting the acoustic shell generates sound waves that are collected by the acoustic transducer for processing.

30 Claims, 12 Drawing Sheets

(56) References Cited

U.S. PATENT DOCUMENTS

| | | |
|---|---|---|
| 9,131,644 B2 | 9/2015 | Osborne |
| D747,984 S | 1/2016 | Zhao et al. |
| 9,342,899 B2 | 5/2016 | Gao et al. |
| 9,841,533 B2 | 12/2017 | Wolf et al. |
| 2013/0014556 A1 | 1/2013 | Salmi |
| 2017/0261647 A1 | 9/2017 | Wolf et al. |

FOREIGN PATENT DOCUMENTS

| | | |
|---|---|---|
| WO | 2013001495 A1 | 1/2013 |
| WO | 2014091314 A2 | 6/2014 |
| WO | 2015071545 A1 | 5/2015 |
| WO | 2017156187 A1 | 9/2017 |

OTHER PUBLICATIONS

Gubler et al., "Use of a weather station based disease risk assessment for control of grapevine powdery mildew in California", Phytopathology, 1997, 87, S36.

Shambel Maru Moges, "Differences Between Red and Green NDVI, What they Predict and What they Do Not Predict", Student Presentation, Oklahoma State University, SOIL/BAE 4213 Precision Agriculture, May 2, 2001, 18 pages.

Wang et al., "Relations between NDVI, Grassland Production, and Crop Yield in the Central Great Plains", Geocarto International, Sep. 2005, 20(3), 5-11.

Bao et al., "Estimation of winter wheat biomass based on remote sensing data at various spatial and spectral resolutions", Front. Earth Sci. China 2009, 3(1), 118-128.

Trono et al., "Rainfall Monitoring Using Acoustic Sensors," Department of Computer & Communications Engineering, Ateneo de Manila University, publically available as early as Nov. 19, 2012.

Jin et al., "Remote Sensing-Based Biomass Estimation and Its Spatio-Temporal Variations in Temperate Grassland, Northern China", Remote Sens., 2014, 6, 1496-1513.

Agisoft LLC, "Tutorial (Beginner level): Orthophoto and DEM Generation with Agisoft PhotoScan Pro 1.1 (without Ground Control Points)", 2015, 11 pages.

Microarial Projects LLC, "Mapping without Ground Control Points: Does it Work?", White Paper, Sep. 2015, 6 pages.

Microarial Projects LLC, "Mapping without ground control points, does it work?", sUAS News, 2015.

International Search Report and Written Opinion received for International Application No. PCT/US2017/021447, dated Jun. 27, 2017, 11 pages.

* cited by examiner

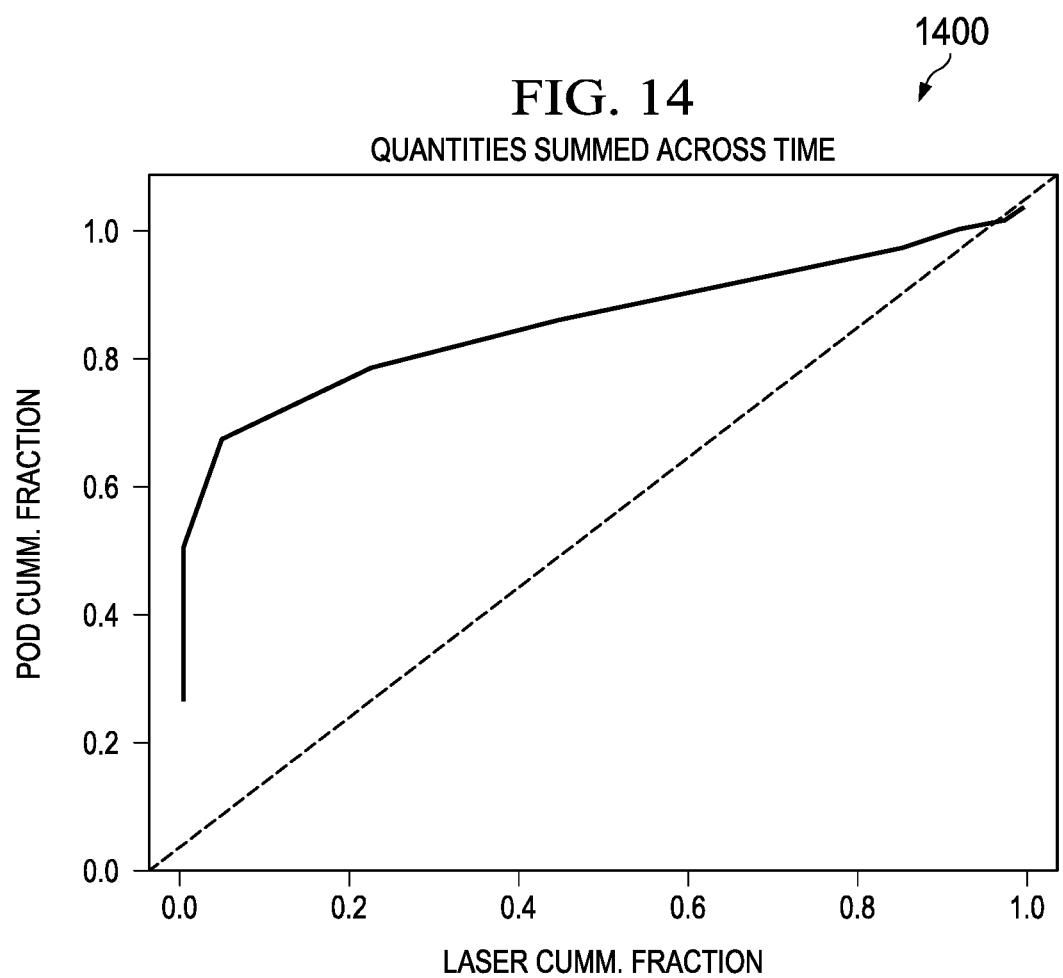

DISDROMETER HAVING ACOUSTIC TRANSDUCER AND METHODS THEREOF

CROSS-REFERENCE TO RELATED APPLICATION

This application is a continuation of U.S. patent application Ser. No. 15/452,457, filed on Mar. 7, 2017, entitled DISDROMETER HAVING ACOUSTIC TRANSDUCER AND METHODS THEREOF, which claims the benefit of U.S. provisional patent application Ser. No. 62/305,211, filed on Mar. 8, 2016, entitled, DISDROMETER HAVING ACOUSTIC TRANSDUCER AND METHODS THEREOF, the disclosures of which are hereby incorporated by reference in their entirety.

TECHNICAL FIELD

Embodiments of the technology relate, in general, to disdrometers, and in particular to disdrometers comprising one or more acoustic transducers.

BACKGROUND

The accurate measurement of rainfall presents a great engineering challenge with large social impact. A wide range of measurement gauges can be used, each having various limitations. Accumulation measurement methods are the most common due to low cost and simple operating procedures. However, these methods have shortcomings in that they can accumulate debris (including hail and snow) that require maintenance, can be poorly calibrated, can suffer from wind-induced losses, can having moving parts that prevent them from being mounted in non-stationary environments, and can be bulky to ship and install. Drop counting methods have various advantages, in that they do not accumulate debris, which reduces maintenance, have no moving parts, which expands the locales where these can be mounted, and can be more compact, which reduces shipping and installation burden. These devices have additional benefits, in that they can distinguish rain from hail, can be used to calibrate Doppler radar with the so-called "Z-factor" measured as a weighted sum of the drop sizes, and thus can be used to interpret rainfall over a broader spatial domain. Devices using drop counting methods, however, can be power demanding and expensive, especially optical-based drop counting devices that utilize a laser for measurement.

BRIEF DESCRIPTION OF THE DRAWINGS

The present disclosure will be more readily understood from a detailed description of some example embodiments taken in conjunction with the following figures:

FIG. 14 is a quantile plot of reference laser disdrometer (X axis) and acoustic power distribution of an acoustic disdrometer (Y axis) in accordance with one non-limiting embodiment.

DETAILED DESCRIPTION

Figure 1:
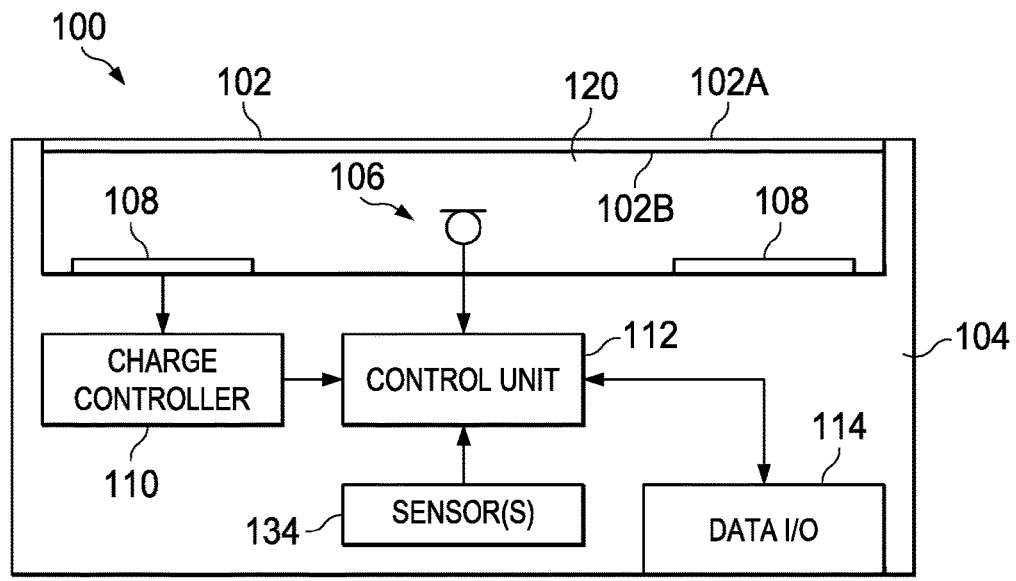
FIG. 1 depicts a simplified block diagram of an example acoustic disdrometer in accordance with a non-limiting embodiment.

Various non-limiting embodiments of the present disclosure will now be described to provide an overall understanding of the principles of the structure, function, and use of the apparatuses, systems, methods, and processes disclosed herein. One or more examples of these non-limiting embodiments are illustrated in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Reference throughout the specification to "various embodiments", "some embodiments", "one embodiment", "some example embodiments", "one example embodiment", or "an embodiment" means that a particular feature, structure, or characteristic described in connection with any embodiment is included in at least one embodiment. Thus, appearances of the phrases "in various embodiments", "in some embodiments", "in one embodiment", "some example embodiments", "one example embodiment", or "in an embodiment" in places throughout the specification are not necessarily all referring to the same embodiment. Furthermore, the particular features, structures or characteristics may be combined in any suitable manner in one or more embodiments.

Some acoustic disdrometers in accordance with the present disclosure can be relatively low maintenance and have low power consumption. Disdrometers in accordance with the present disclosure can utilize one or more acoustic transducers, such as a micro electro-mechanical system (MEMS) microphones or condenser-type microphones, for example, for precipitation measurement based on acoustic signals generated by the precipitation's kinetic force impact and propagated through the air. This approach is in contrast to impact-type disdrometers that use piezo-type or pressure force transducers for measuring signals propagating through a solid. The approach utilized by acoustic disdrometers in accordance with the present disclosure is also in contrast to other types of acoustic disdrometers that may rely on microphones to measure signals propagating through a liquid, for instance.

Example acoustic disdrometers in accordance with the present disclosure can facilitate calculation of a rainfall rate directly from the frequency (v) and power (P) of the received acoustic signal generated by individual drops within a time interval:

$$R = \Sigma_{i=0}^{N} f(v_i, P_i) \qquad \text{EQ. 1}$$

where R is the rainfall rate (mm/hr), N are the total number of drops, and f(v,P) is a mathematical function that could take one of many forms including but not limited to linear regression.

Example acoustic disdrometers in accordance with the present disclosure can also enable calculation of drop sizes directly:

$$D_i = g(v_i, P_i) \qquad \text{EQ 2}$$

where g(v,P) is a mathematical function to calculate a drop size D from frequency and power. Such an estimate allows calculation of R from the measured D distribution:

$$R = \sum_{i=0}^{N} \frac{4}{3}\pi \left(\frac{D_i}{2}\right)^3 \qquad \text{EQ. 3}$$

One advantage of estimating the drop size distribution $D_i$ is to facilitate calculation of a radar reflectivity factor (Z), as provided by EQ. 4:

$$Z = \int_0^{D_{max}} N_0 e^{-\Lambda D} D^6 dD, \qquad \text{EQ. 4}$$

where N is the number of drops (m$^{-3}$), D is the diameter of drops (mm), and the resultant Z is in units mm$^6$m$^{-3}$. This formula can be used in the derivation of rainfall intensity from radar using an assumed relationship between Z and rainfall rate. As such, any errors in the assumed drop size distribution and the actual drop size distribution results in errors in the rainfall rate estimated by radar.

In some embodiments, a solar panel array can be incorporated into the acoustic disdrometer. The solar panel array can be mounted internal to the device, as to protect it from the elements and can reduce the total size of the device. Additionally or alternatively, the solar panel array can be mounted external to the device, as may be necessary based on certain mounting environments, for instance. Certain embodiments can include wired or wireless communications for data sharing so that rainfall calculations or other types of calculations can be performed by a remote computing system (i.e., a cloud-based system) or a data stream for data visualization can otherwise be provided by the disdrometer to a recipient data ingestion system.

Figure 2:
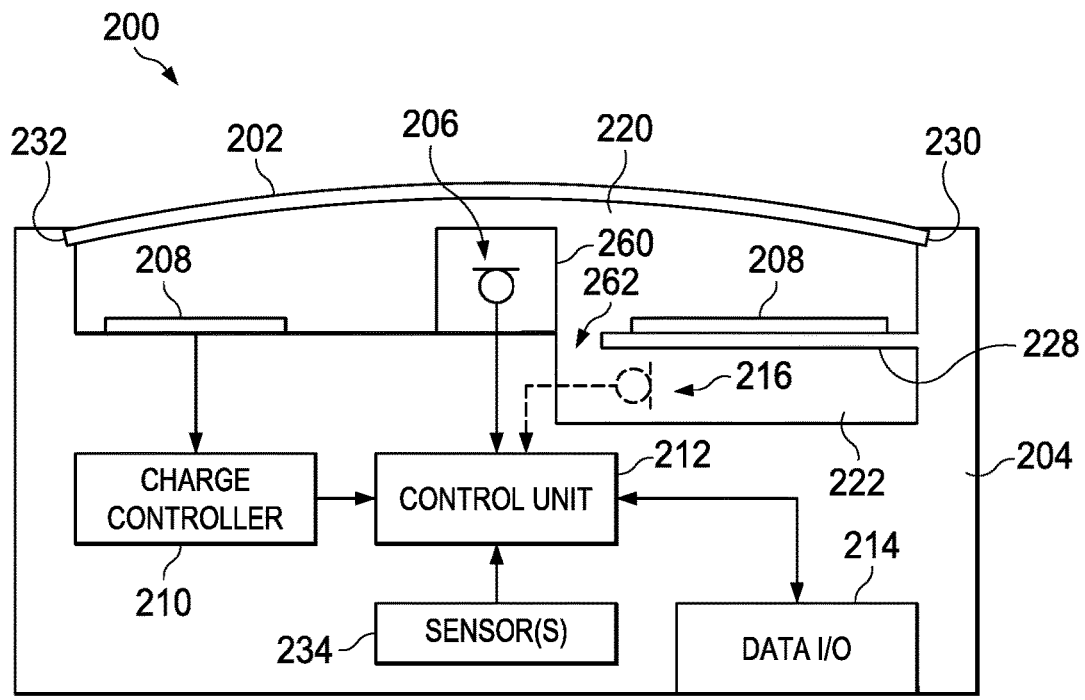
FIG. 2 depicts a simplified block diagram of another example acoustic disdrometer in accordance with a non-limiting embodiment.

FIG. 1 depicts a simplified block diagram of an example acoustic disdrometer 100 in accordance with one non-limiting embodiment. The acoustic disdrometer 100 can have a housing 104 that interfaces with an acoustic shell 102, such as around its perimeter, and houses various components and at least partially defines one or more cavities or chambers within the acoustic disdrometer 100. The acoustic shell 102 can be oriented such that it will be impacted by precipitation and generate sound waves having a frequency profile and amplitude profile corresponding to various forms and rates of various precipitation types. The acoustic shell 102 can be generally planar, as depicted in FIG. 1, or it can be generally curved or rounded (i.e. domed shaped), as depicted in FIG. 2, or have any other suitable configuration. The acoustic shell 102 can be made from any suitable materials, such as polycarbonate, or other plastic materials. In some embodiments, the outer surface of the acoustic shell 102 can have hydrophobic coating to assist with rainfall shedding. In some embodiments, at least part of the acoustic shell 102 can be transparent, or otherwise allow light rays to penetrate through the acoustic shell 102, as described in more detail below.

Portions of the housing 104 and an inner surface of the acoustic shell 102 can cooperate to define an acoustic chamber 120 located interior to the acoustic disdrometer 100. As shown, the acoustic shell can have an outer surface 102A and an inner surface 102B, with at least a portion of the inner surface 102B defining the air-filled acoustic chamber 120. An acoustic transducer 106 can be positioned within the acoustic chamber 120 to translate the impact of precipitation (rain, hail, etc.) on an outer surface of the acoustic shell 102 into a signal readable by a control unit 112 for signal processing. As such, the impact of precipitation of the outer surface 102B vibrates the acoustic shell 102 to generate sound waves that propagate through the acoustic chamber 120 and that are picked up by the acoustic transducer 106. The acoustic transducer 106 can be, for example, a micro electro-mechanical system (MEMS) microphone having an integrated analog to digital converter that is positioned at or near the center of the acoustic chamber 120. In some embodiments, the acoustic transducer 106 is a microphone suitable for embedded applications (e.g. cellular telephones). In some embodiments, the acoustic transducer can be a condenser-type microphone that provides an analog signal that is digitized by a separate chip. As individual drops of rain, hail, or sleet impact the acoustic shell 102, the acoustic transducer 106 generates corresponding signals for processing by a control unit 112. As discussed in more detail below, characteristics of the signals (such as power and frequency) can be used to determine precipitation amounts.

In some embodiments, onboard power generation techniques are utilized. As shown in FIG. 1, the acoustic disdrometer 100 can comprise a solar array 108. The solar array 108 can be configured to generate power to satisfy some or all of the power consumption requirements of the acoustic disdrometer 100. The solar array 108 can be in communication with a charge controller 110 which can include, for example, a maximum power point controller or voltage regulator. In some embodiments, onboard power storage sources can be utilized (i.e., solar-charged battery cells, etc.).

Figure 3:
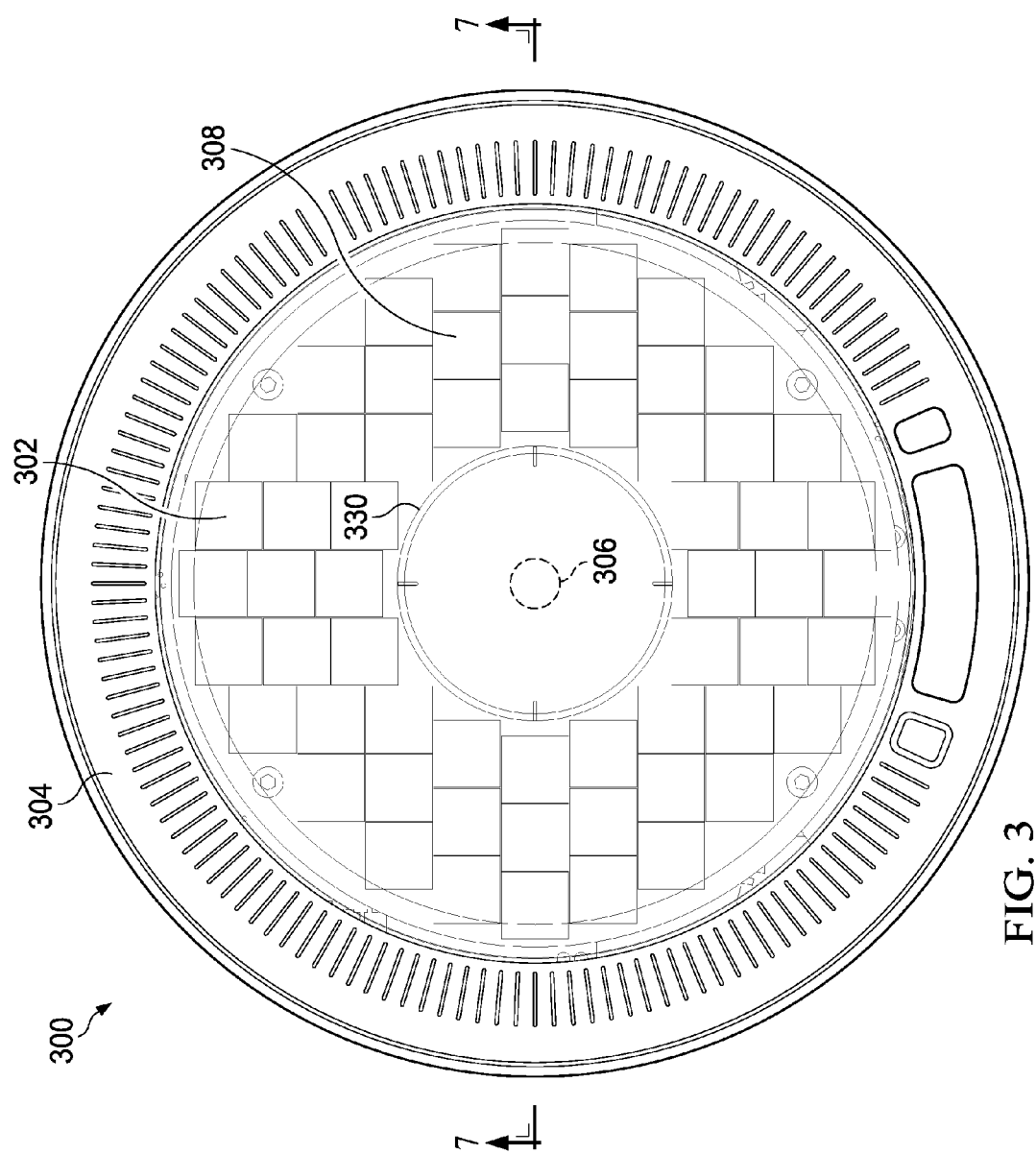
FIG. 3 depicts a top view of an example acoustic disdrometer in accordance with a non-limiting embodiment.
Figure 6:
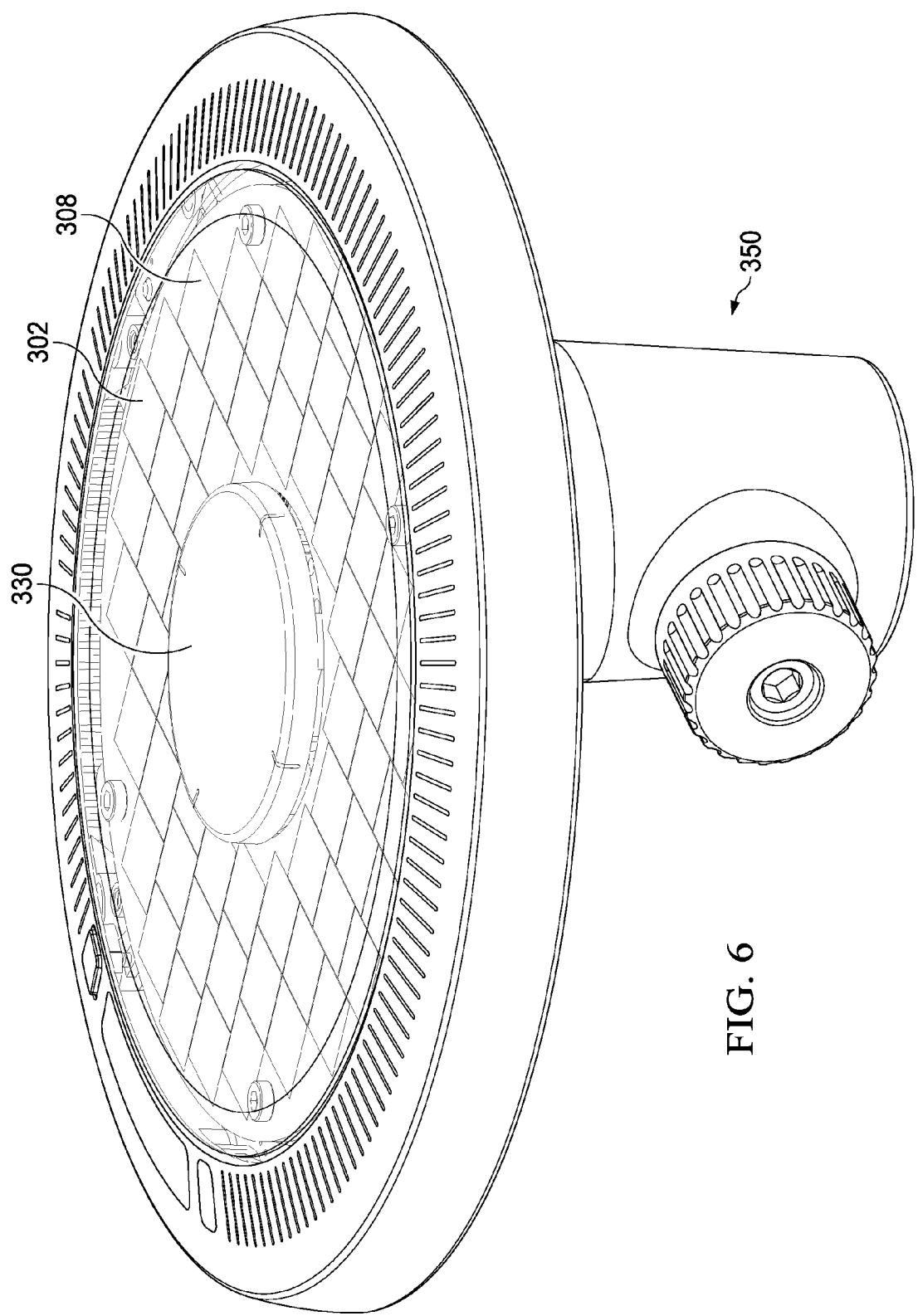
FIG. 6 is an isometric view of the example acoustic disdrometer shown in FIG. 3.
Figure 8:
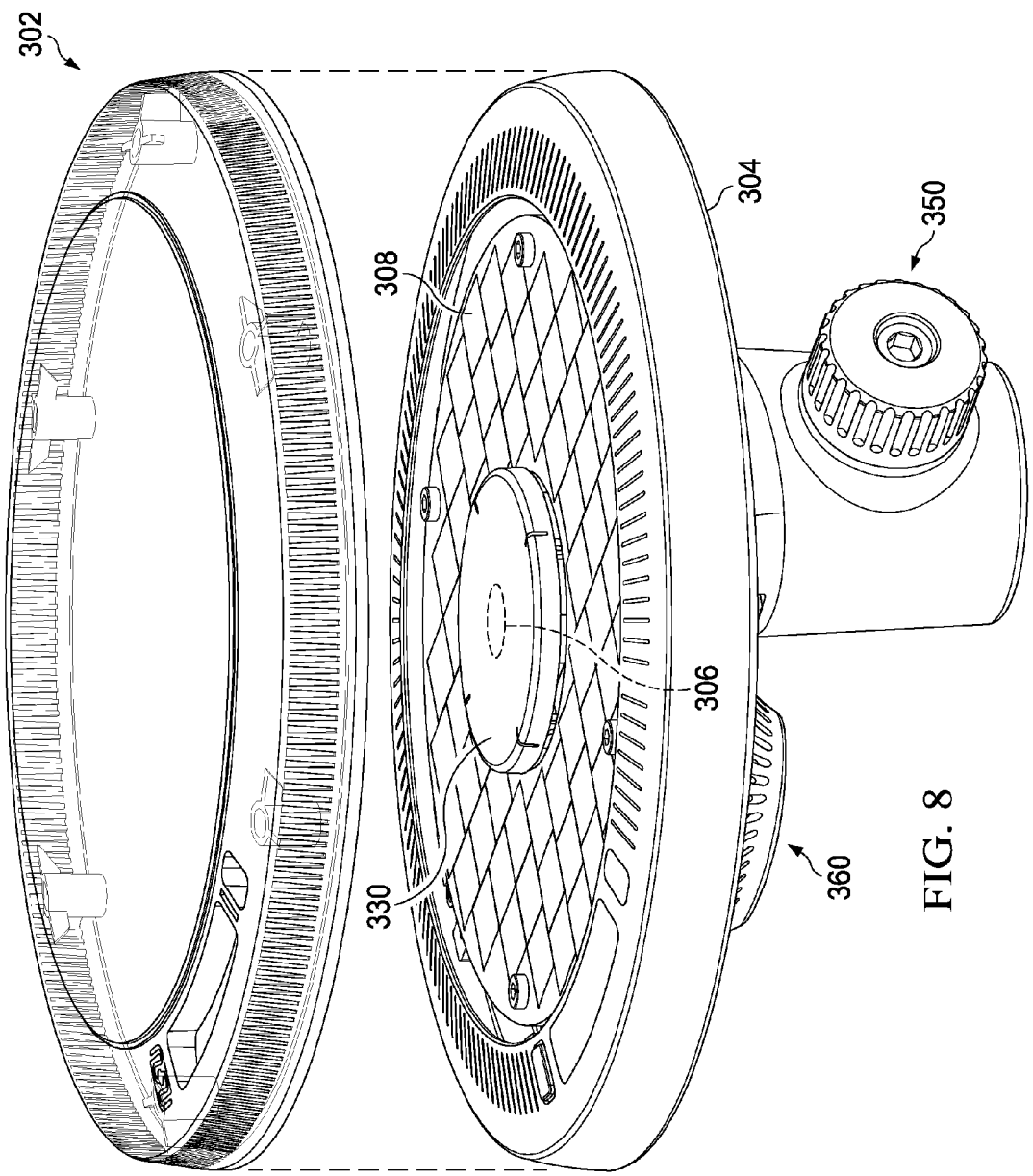
FIG. 8 is an exploded isometric view of the example acoustic disdrometer shown in FIG. 3 with an acoustic shell separated from a housing of the acoustic disdrometer.

In the illustrated embodiment, the acoustic shell 102 is transparent, or at least partially transparent or translucent, and the solar array 108 is positioned internal to the acoustic chamber 120. In other embodiments, the solar array 108 is positioned external to the acoustic chamber 120. In such embodiments, the acoustic shell 102 may be non-transparent or at least partially non-transparent. As illustrated in FIGS. 3, 6, and 8, in some embodiments the solar array 108 can be generally circular having an outer diameter similar to the outer diameter of the acoustic shell 102, although this disclosure is not so limited. The acoustic transducer 106 can be positioned in the center of the solar array 108, such that the solar array 108 generally forms a ring around the acoustic transducer 106. The control unit 112 and/or other modules of the acoustic disdrometer 100 can be powered based on voltage generated by the solar array 108.

In some configurations, the acoustic disdrometer 100 can include additional on-board sensors, schematically depicted as sensor(s) 134. Data received from sensors associated with the acoustic disdrometer 100 can be used to measure, crop water demand (using shortwave and longwave radiation, humidity, air temperature, and crop and sky temperature), and among others. The acoustic disdrometer 100 can also include a data input/output module 114. The data I/O module 114 can include, for example, one or more wireless communication radios or modules to support various wireless communication protocols (i.e., Wifi-based protocols, LTE or GSM protocols, Bluetooth protocols, near field communication protocols, satellite protocols, cellular protocols, etc.). In some embodiments, the data I/O module 114 can also provide for wired interfaces, such as a USB-interface, Ethernet-interface, and so forth. In some operational environments, the acoustic disdrometer 100 can generally function as a weather monitor to enable various data-intensive natural resource management or civil infrastructure management software services. Furthermore, the acoustic disdrometer 100 can include GPS for synthesizing with other geospatial data.

The data I/O module 114 can be used by the acoustic disdrometer 100 to transmit data to a data collection server in real-time, substantially real-time, or in batch format. Additionally or alternatively, the data I/O module 114 can be used by the acoustic disdrometer 100 to receive data from one or more sensors 134, such as sensors for measuring soil moisture, air quality, water pressure and flow, electrical current, and so forth. Additionally or alternatively, the sensor 134 can in include spectrometer(s), an accelerometer, among other sensors or data collection instruments or systems. Additional tools, such as soil moisture and salinity monitoring devices, a camera, or equipment monitors can be interface with one or more ports of the data I/O module 114.

FIG. 2 depicts a simplified block diagram of another example acoustic disdrometer 200 in accordance with one non-limiting embodiment. The acoustic disdrometer 200 can have a housing 204 that interfaces with an acoustic shell 202 to define an acoustic chamber 220. In this embodiment, the acoustic shell 202 has a dome shape that can aid in water shedding. The outer perimeter of the acoustic shell 202 can be circumscribed by a rib 230 to acoustically isolate it from other mechanical components. The rib 230 can be received into a corresponding groove 232 on the housing 204. Various other technical for acoustic isolation can be used, such as an O-ring, or other dampening devices. The size and shape of the acoustic shell 202, as well as its attachment technique to the housing 204, can vary. In some embodiments, the acoustic shell 202 is circular and has a diameter of more than about 50 cm. In some embodiments, the acoustic shell 202 is circular and has a diameter of less than about 50 cm. In some embodiments, the acoustic shell 202 is circular and has a diameter of less than about 40 cm. In some embodiments, the acoustic shell 202 is circular and has a diameter of less than about 20 cm. In some embodiments, the acoustic shell 202 is circular and has a diameter of less than about 10 cm. In some embodiments, the acoustic shell 202 is circular and has a diameter of about 13.75 cm. Further, in some embodiments the acoustic shell 202 is about 1 mm thick. In some embodiments the acoustic shell 202 is about 1.5 mm thick. In some embodiments the acoustic shell 202 is about 2 mm thick. In some embodiments, the acoustic shell 202 can be made of metal and can be less than 1 mm thick. Depending on the configuration of the acoustic shell 202, it may be thicker at the edges where it meets the housing 204. In embodiments utilizing a curved acoustic shell 202, the curvature can be equivalent to a spherical radius of less than about 70 cm. In embodiments utilizing a curved acoustic shell 202, the curvature can be equivalent to a spherical radius of less than about 60 cm. In embodiments utilizing a curved acoustic shell 202, the curvature can be equivalent to a spherical radius of less than about 50 cm. In embodiments utilizing a curved acoustic shell 202, the curvature can be equivalent to a spherical radius of less than about 40 cm.

The position of the acoustic transducer 206 within the acoustic chamber 220 to can be selected to achieve desired performance. In some embodiments, the acoustic transducer 206 is positioned approximately ½ radius distance away from the center of the dome of the acoustic shell 202. In some embodiments, the acoustic transducer 206 is positioned approximately ⅛ radius distance away from the center of the dome. In some embodiments, the primary vibrational mode of the acoustic shell 202 can be about 440 Hz. In some embodiments, the primary vibrational mode of the acoustic shell 202 can be about 550 Hz. In some embodiments, the primary vibrational mode of the acoustic shell 202 can be about 660 Hz. Beneficially, the frequency of the primary vibrational mode can be above traffic noise (approx. 125 Hz) and below airplane noise (approx. 2000 Hz) and is of a frequency within the human-perceptive range that is typical of many widely available consumer grade microphones.

Similar to FIG. 1, the acoustic shell 202 can be transparent to allow for a solar array 208 positioned within the acoustic chamber 220 to be exposed to sunlight. The solar array 208 can be in communication with a charge controller 210. The acoustic disdrometer 200 can further comprise an acoustic transducer 206, control unit 212, sensor(s) 234, and a data I/O module 214, similar to FIG. 1.

The acoustic disdrometer 200 in FIG. 2 schematically depicts a chamber that is at least partially separated from the acoustic chamber 220, shown as dead air chamber 222. In the illustrated embodiment, the dead air chamber 222 is separated from the acoustic chamber 220 by a physical barrier 228, such that the acoustic chamber 220 is backed by the dead air chamber 222. In some embodiments, the physical barrier 228 can allow for airflow between the acoustic chamber 220 and the dead air chamber 222 through a port 262. The dead air chamber 222 can serve to generally isolate the acoustic chamber 220 from potential sources of noise, thus increasing the signal to noise ratio (SNR). The physical barrier 228 shown in acoustic disdrometer 200 comprises the solar array 208, but additional or alternative types of physical barriers can be used, such as a printed circuit board positioned within the housing 204, for example. A secondary acoustic transducer 216 can be positioned within the dead air chamber 222 to generate additional signals for processing. The signals received by the control unit 212 from secondary acoustic transducer 216 can be used to remove common mode noise such as machinery, wind, or voices, included in the signal received from the acoustic transducer 206, thereby seeking to improve the signal to noise performance of the acoustic disdrometer 200. Thus, the secondary acoustic transducer 216 can collect sounds that do not originate from the rain drops hitting the acoustic shell 202, but would otherwise be present in the signal of the acoustic transducer 206 in the acoustic chamber 220, i.e. common-mode acoustic noise. Analysis of this second stream of data from the secondary acoustic transducer 216 by the control unit 212, or other associated processor, can allow the common mode acoustic noise (i.e., ambient noise) to be eliminated, or at least reduced, which can further increase the SNR of the acoustic disdrometer.

The acoustic disdrometer 200 depicted in FIG. 2 also schematically depicts a housing 260 that is configured to totally or at least partially surround the acoustic transducer 206. In some embodiments, the housing 260 is generally puck-shaped. The housing 260 can be configured to function as a support structure to prevent dome collapse. The housing 260 can rest on the physical barrier 228, which in turn is supported by a structure that is integral to the bottom of the dead air chamber 222. This structural configuration can add considerable strength against impact which might otherwise damage the acoustic shell 202.

Figure 4:
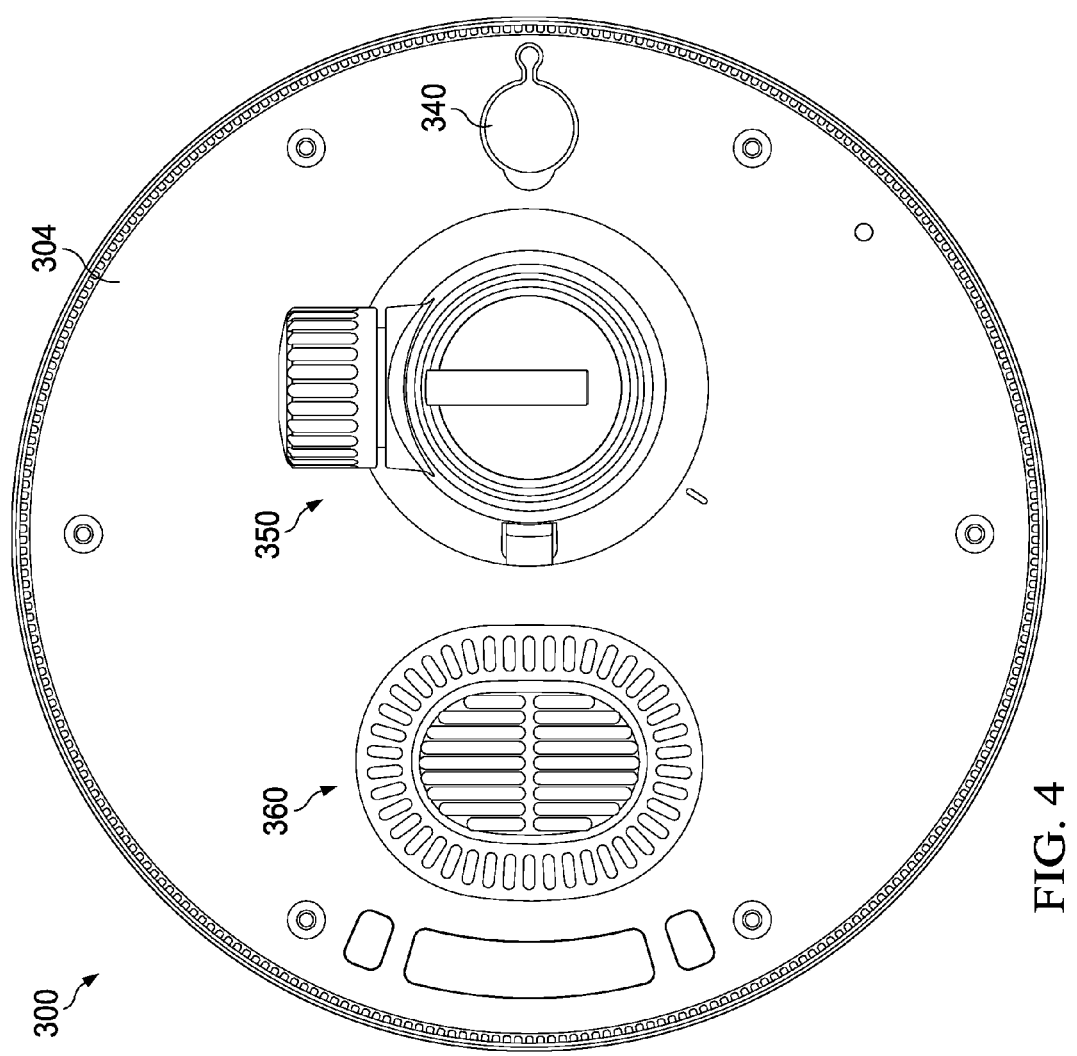
FIG. 4 is a bottom view of the example acoustic disdrometer shown in FIG. 3.
Figure 5:
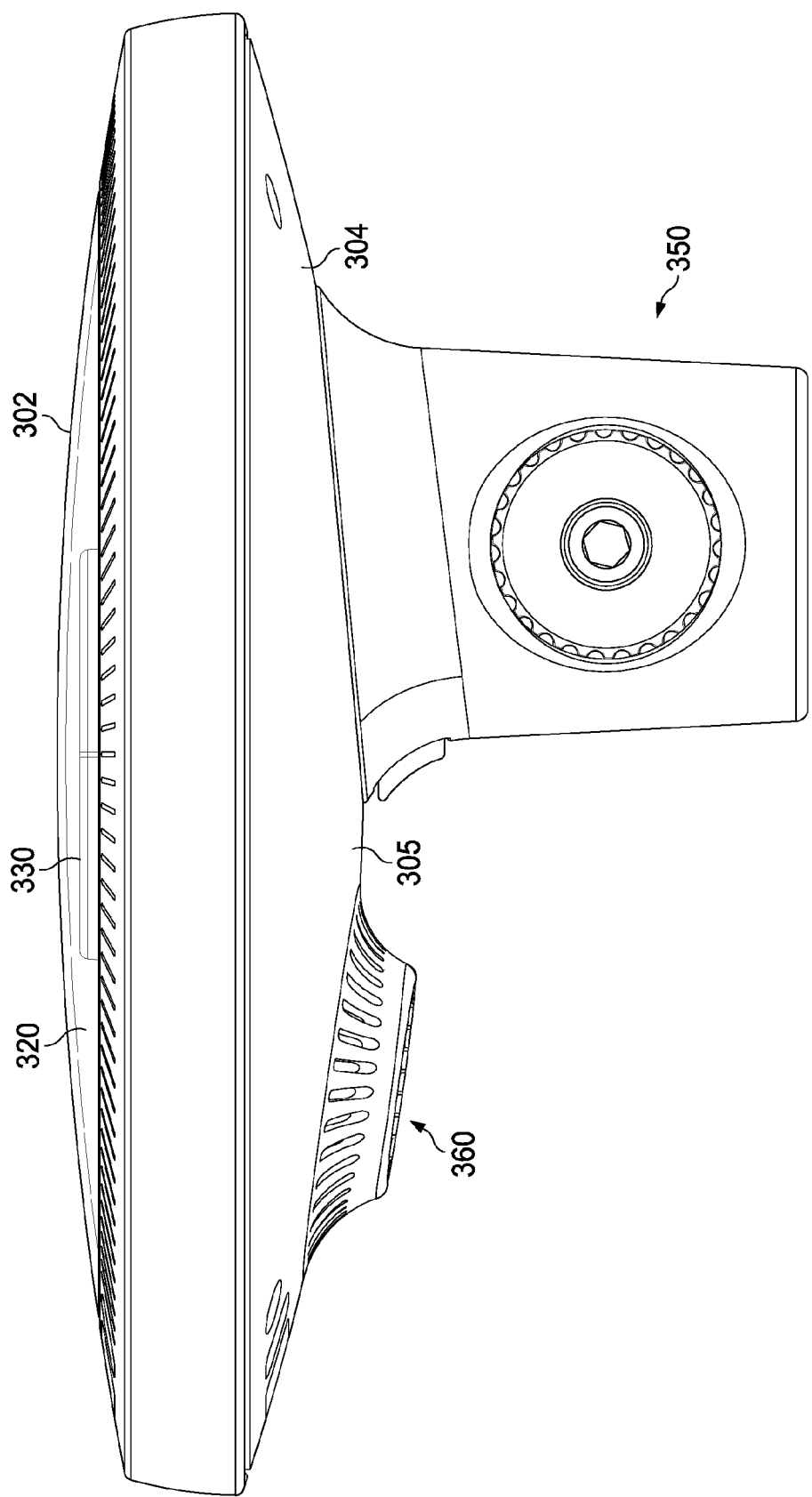
FIG. 5 is a side view of the example acoustic disdrometer shown in FIG. 3.
Figure 7:
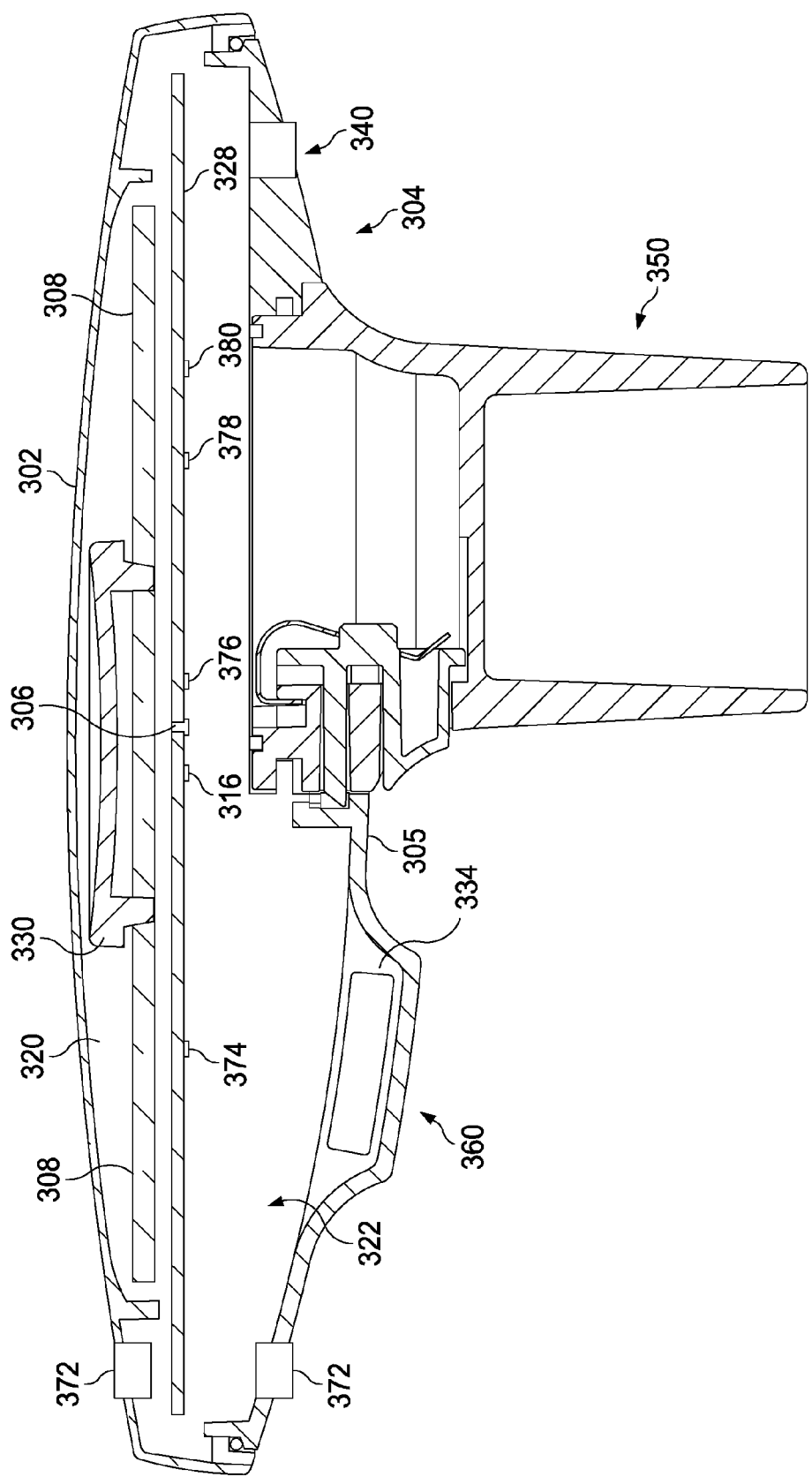
FIG. 7 is a cross-sectional view of the example acoustic disdrometer shown in FIG. 3 taken along line 7-7.

Another example acoustic disdrometer 300 is depicted in FIGS. 3-8 in accordance with a non-limiting embodiment. FIG. 3 depicts a top view, FIG. 4 depicts a bottom view, FIG. 5 depicts a side view, FIG. 6 is an isometric view, FIG. 7 is a cross-sectional view taken along line 7-7 in FIG. 3, and FIG. 8 is an exploded view. Referring to FIGS. 3-8, the acoustic disdrometer 300 can have a housing 304 that interfaces with an acoustic shell 302 to define an acoustic chamber 320. As shown in FIG. 3, the acoustic shell 302 in the illustrated embodiment is transparent to allow for a solar array 308 mounted within the acoustic chamber 320 to be exposed to sunlight. The example acoustic disdrometer 300 includes a dead air chamber 322, as depicted in FIG. 3. Similar to the acoustic disdrometer 200 of FIG. 2, the dead air chamber 322 is separated from the acoustic chamber 320 by a physical barrier 328, such that the acoustic chamber 320 is backed by the dead air chamber 322. Similar to FIG. 2, the acoustic disdrometer 300 depicted in FIGS. 3-8 also comprises a housing 330 that is configured to surround an acoustic transducer 306. Further, a secondary acoustic transducer 316 is shown positioned within the dead air chamber 322. While the housing 330 is illustrated as being generally cylindrically-shaped, this disclosure is not so limited. The acoustic disdrometer 300 also includes an auxiliary port 340. The auxiliary port 340 can allow connectivity between the acoustic disdrometer 300 and one or more devices.

In some embodiments, the auxiliary port 340 can receive data from auxiliary sensors. In some embodiments, the auxiliary port 340 can receive power from an external DC source or solar panel. In some embodiments, the auxiliary port 340 can be used to transmit data using means that are not present in the main device embodiment.

On-board sensors can provide additional data inputs to the system. In the illustrated embodiment, the acoustic disdrometer 300 is schematically shown to include shortwave and longwave spectral sensors 372, a cellular modem 374, an accelerometer 376, and a GPS 378 (FIG. 7). The sensors can be used to provide additional data to improve the accuracy and/or performance of the acoustic disdrometer 300. For instance, the accelerometer 378 can assist with the correction of mechanical vibration. While these components are schematically shown being attached to the physical barrier 328, it is to be appreciated that any of these components can be located at other internal or external positions. Further, in some embodiments, acoustic disdrometer 300 can comprise a wetness detector such that power requirements of the device can be reduced by avoiding the use of the control until necessary conditions (e.g. wetness) are met.

As shown in the illustrated embodiment, the acoustic disdrometer 300 can include a vented zone 360. The vented zone 360 can house various sensors 334, such as an air temperature sensor, a humidity sensor, barometric pressure sensor, and the like. The vented zone 360 can be positioned in any suitable location. In the illustrated embodiment zone 360 protrudes from an undersurface 305 of the housing 304 can allow for air flow proximate to the sensors 334. The acoustic disdrometer 300 depicted in FIG. 3 also comprises a mounting assembly 350. While the mounting assembly 350 is shown to facilitate mounting the acoustic disdrometer 300 to a post, other mounting assemblies can be used.

Figure 9:
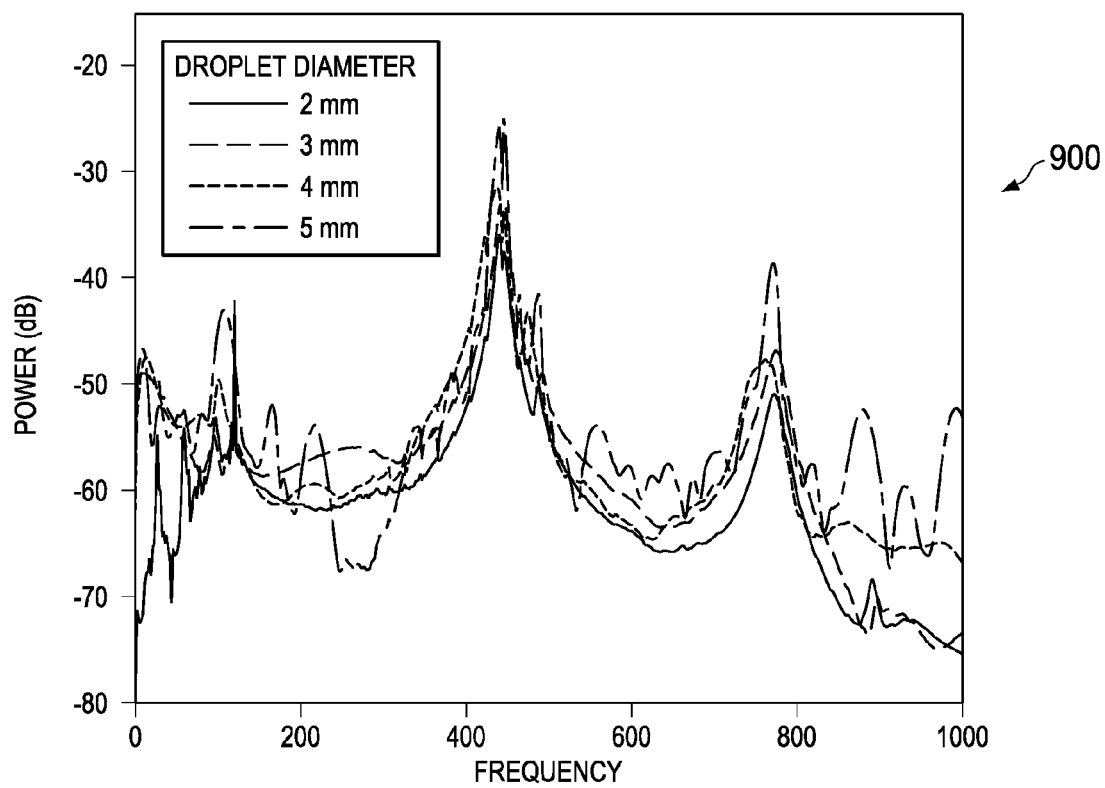
FIG. 9 is a chart plotting frequency (Hz) vs. power (dB) for example droplet diameters in accordance with one non-limiting embodiment.
Figure 10:
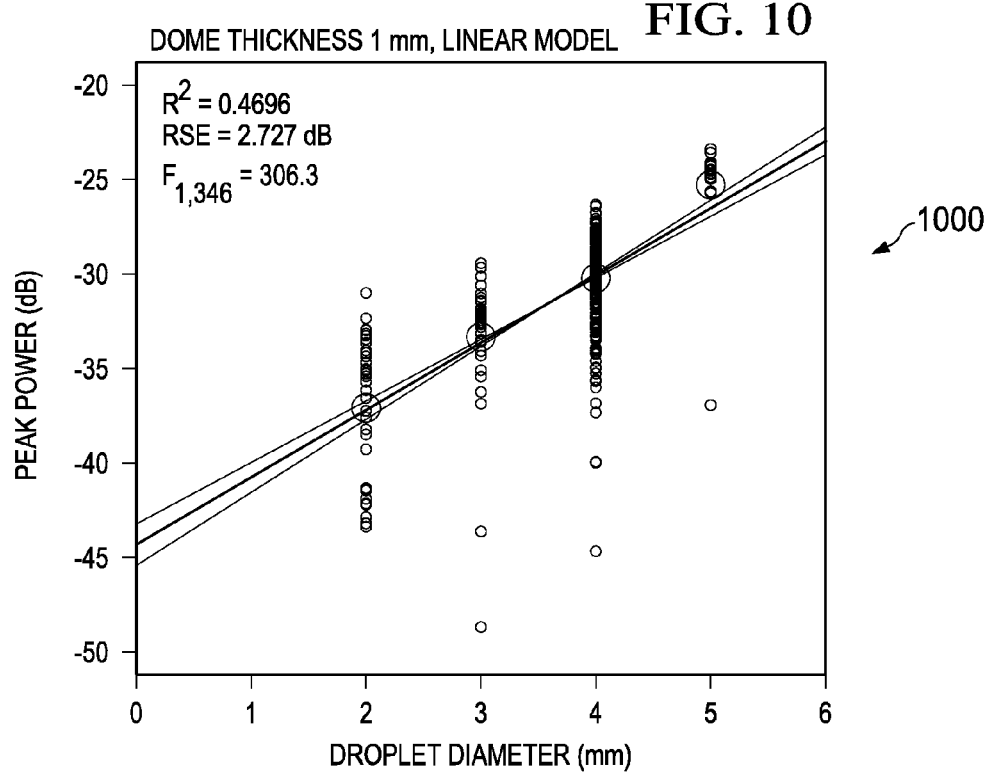
FIG. 10 is a chart plotting droplet diameter (mm) vs. peak power (dB).

Acoustic disdrometers in accordance with the present disclosure convert drop impact of an acoustic shell in into an acoustic signal. Based on local or remote processing of the acoustic signal, precipitation rates, drop size distributions, identifications of rain and hail, among other precipitation-related parameters can be determined. FIG. 9 is a chart 900 plotting acoustic frequency (Hz) vs. acoustic power (dB) for example droplet diameters dropped onto an acoustic shell from a distance of 29 feet. FIG. 10 is an example chart 1000 plotting droplet diameter (mm) vs. Peak power (dB). To generate the data presented in FIG. 9 and FIG. 10, sounds generated by the kinetic force impact of water drops were recorded with a commercial-off-the-shelf (COTS) MEMS microphone measuring sound from 20 Hz-20 kHz. As shown in FIG. 9, the observed drops show a peak at 440 Hz, with high signal strength for even the smallest drop size used in the test (2 mm). The power of the peak at this frequency also shows a strong linear relationship with drop diameter, as depicted in FIG. 10. Raw rainfall rate can be calculated as the sum of the volume of all drops falling in some period of time, divided by area of the acoustic shell and time. For dome-shaped acoustic shells, the effective area of the acoustic shell can be about 72%, for example, depending upon the curvature of the dome and total diameter. The Z-factor of the rainfall can be calculated by summing the measured drop diameter counts raised to the 6th power in some volume. In some embodiments, a library of acoustic waveforms can be utilized to identify and flag spurious signals generated by the acoustic disdrometers, as may be generated from machinery, voices, wind. Such a library can be developed, for example by machine learning algorithms that can categorize signals, such as by types of sounds.

Figure 11:
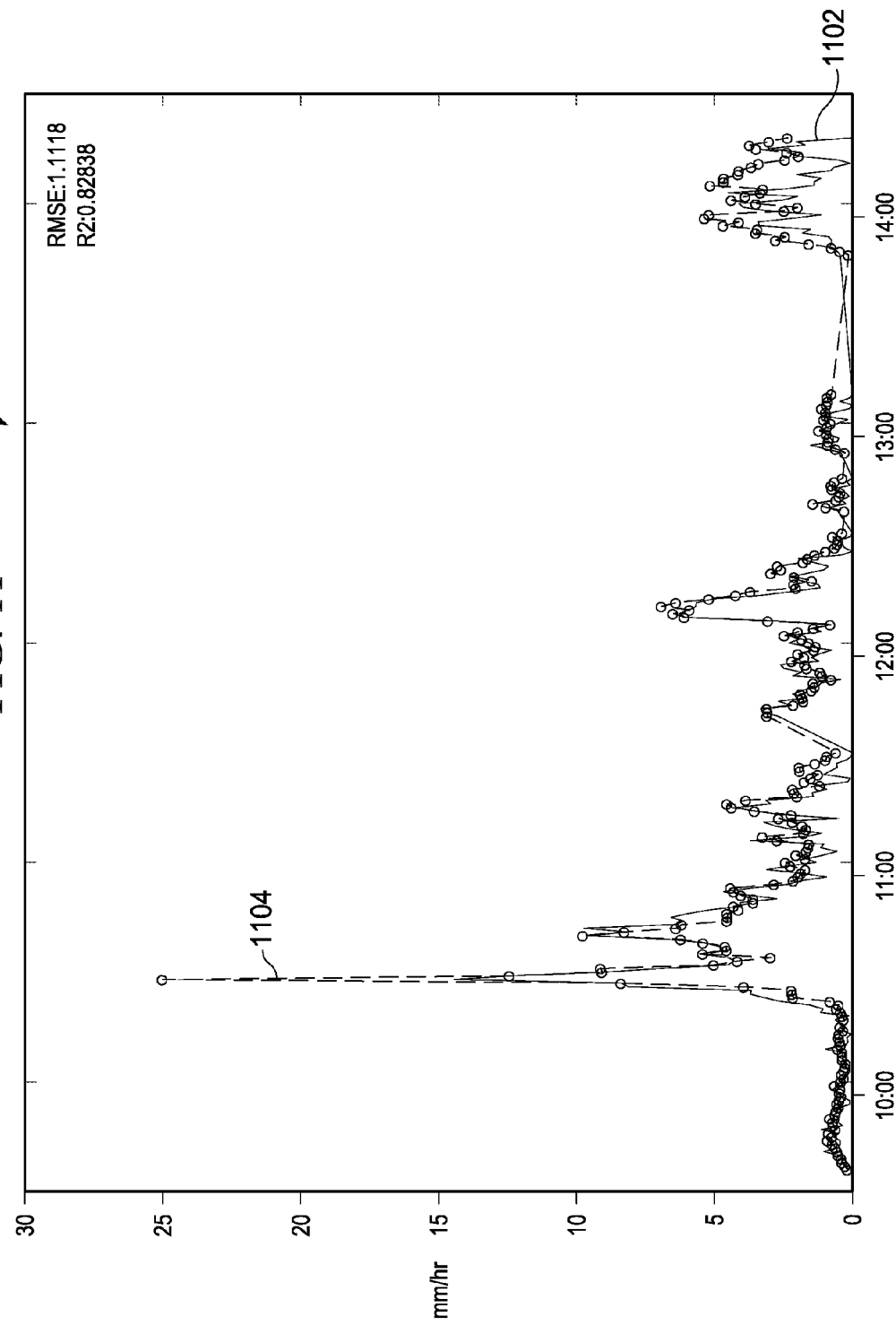
FIG. 11 is a chart plotting rainfall across a period of time in accordance with one non-limiting embodiment.

FIG. 11 depicts a chart 1100 plotting an example rainfall across a period of time. The plot 1100 includes data 1102 which is representative of a rainfall rate over the period of time. The data 1104 is representative of the measured rainfall rate as measured by an acoustic disdrometer in accordance with the present disclosure. For the data presented in chart 1100, the root mean square error (RMSE) is 1.1118 mm/hr and the coefficient of determination (R2) is 0.82838.

Figure 12:
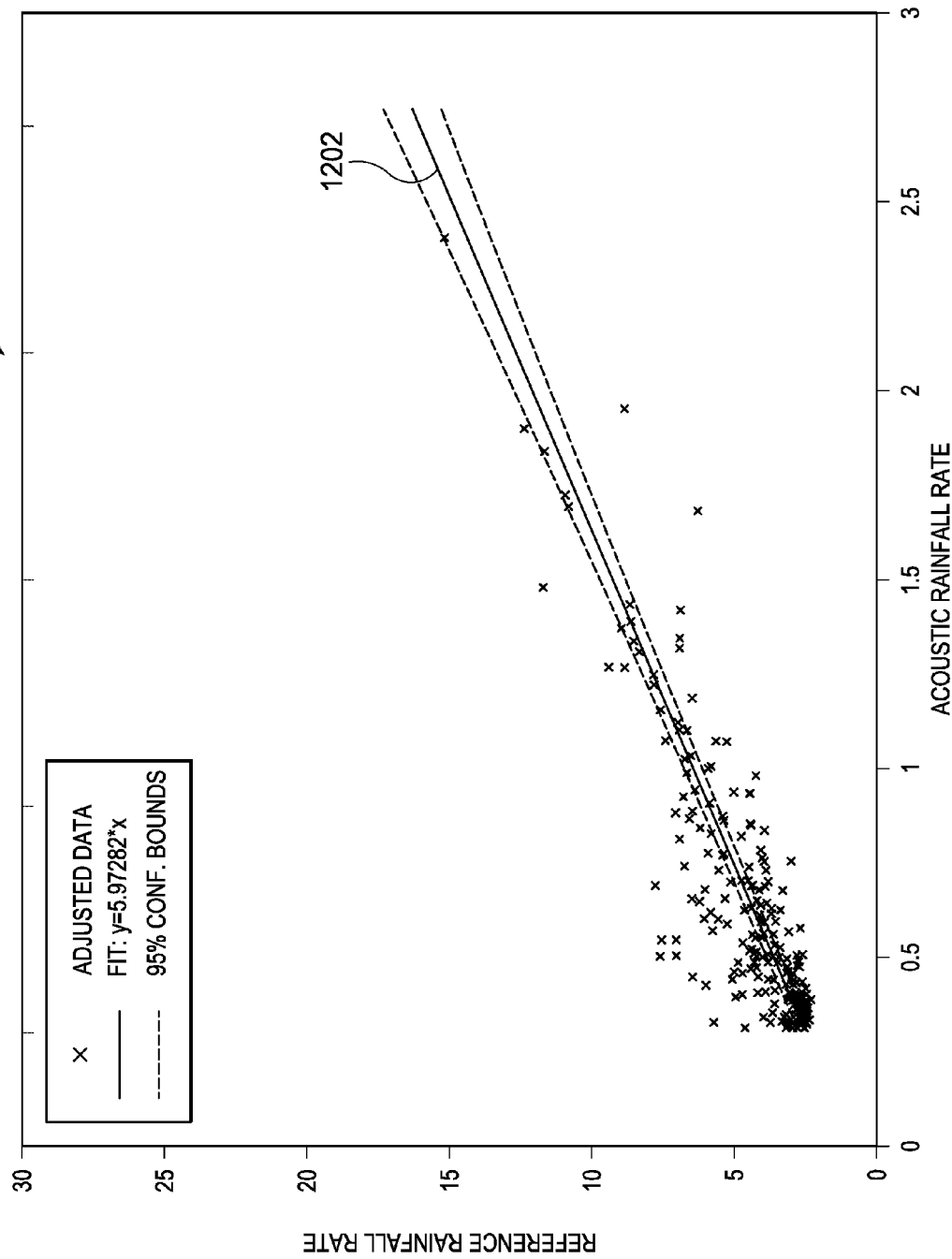
FIG. 12 depicts a linear regression for data measured by an acoustic disdrometer in accordance with the present disclosure.

Referring now to FIG. 12, a chart 1200 depicts a linear regression 1202 for data measured by an acoustic disdrometer in accordance with the present disclosure between acoustic rainfall rate (X axis) versus reference rainfall rate (Y axis).

Figure 13:
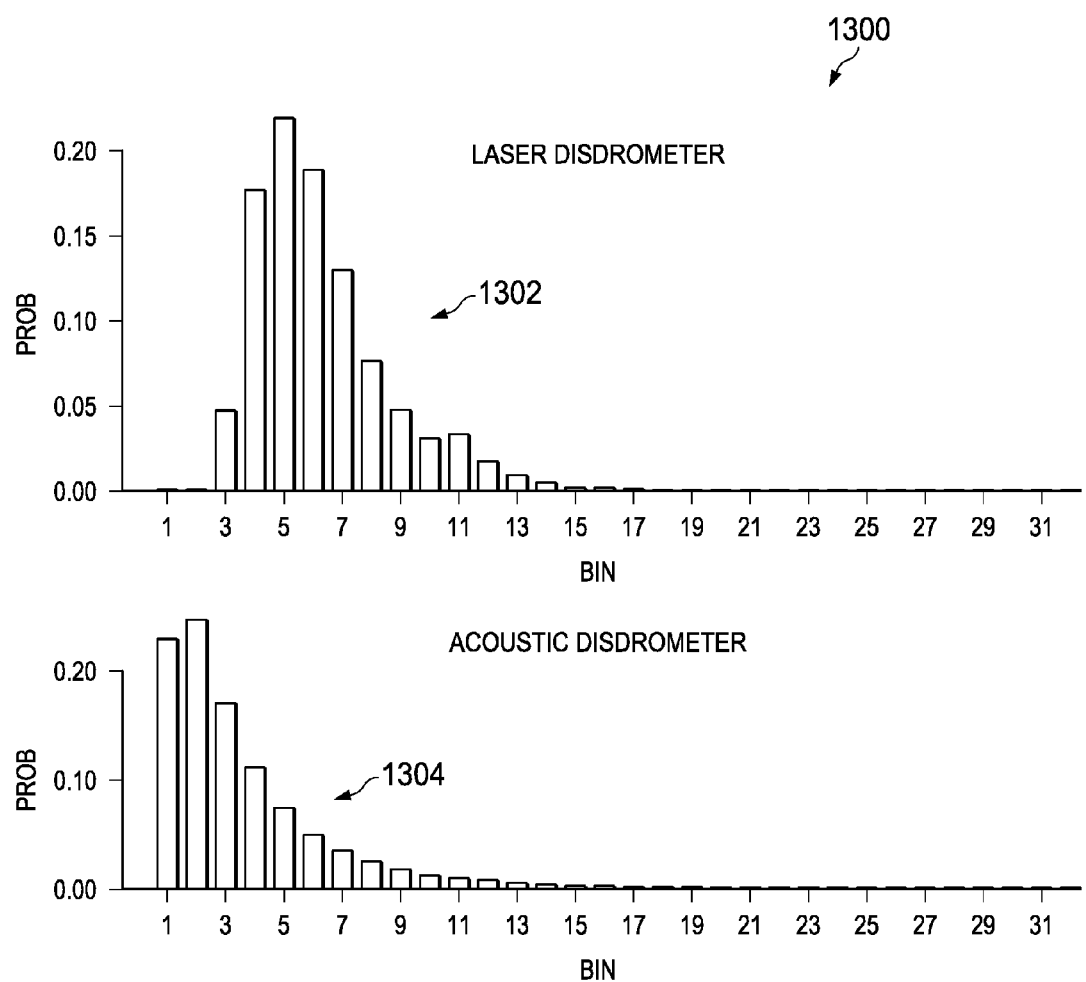
FIG. 13 is a chart plotting drop size distributions in accordance with one non-limiting embodiment

FIG. 13 is a chart 1300 plotting drop size distributions 1302, 1304. Drop size distribution 1302 is measured by a laser disdrometer and drop size distribution 1304 is measured by an acoustic disdrometer in accordance with the present disclosure.

FIG. 14 is a chart 1400 is a quantile plot of reference laser disdrometer (X axis) and acoustic power distribution of an acoustic disdrometer (Y axis) in accordance with the present disclosure. Chart 1400 illustrates one potential transfer function from drop size distribution to acoustic power distribution.

The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

In general, it will be apparent to one of ordinary skill in the art that at least some of the embodiments described herein can be implemented in many different embodiments of software, firmware, and/or hardware. The software and firmware code can be executed by a processor or any other similar computing device. The software code or specialized control hardware that can be used to implement embodiments is not limiting. For example, embodiments described herein can be implemented in computer software using any suitable computer software language type, using, for example, conventional or object-oriented techniques. Such software can be stored on any type of suitable computer-readable medium or media, such as, for example, a magnetic or optical storage medium. The operation and behavior of the embodiments can be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Moreover, the processes described herein can be executed by programmable equipment, such as computers or computer systems and/or processors. Software that can cause programmable equipment to execute processes can be stored in any storage device, such as, for example, a computer system (nonvolatile) memory, an optical disk, magnetic tape, or magnetic disk. Furthermore, at least some of the processes can be programmed when the computer system is manufactured or stored on various types of computer-readable media.

It can also be appreciated that certain portions of the processes described herein can be performed using instructions stored on a computer-readable medium or media that direct a computer system to perform the process steps. A computer-readable medium can include, for example, memory devices such as diskettes, compact discs (CDs), digital versatile discs (DVDs), optical disk drives, or hard disk drives. A computer-readable medium can also include memory storage that is physical, virtual, permanent, temporary, semipermanent, and/or semitemporary.

A "computer," "computer system," "host," "server," or "processor" can be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein can include memory for storing certain software modules used in obtaining, processing, and communicating information. It can be appreciated that such memory can be internal or external with respect to operation of the disclosed embodiments. The memory can also include any means for storing software, including a hard disk, an optical disk, floppy disk, ROM (read only memory), RAM (random access memory), PROM (programmable ROM), EEPROM (electrically erasable PROM) and/or other computer-readable media. Non-transitory computer-readable media, as used herein, comprises all computer-readable media except for a transitory, propagating signals.

In various embodiments disclosed herein, a single component can be replaced by multiple components and multiple components can be replaced by a single component to perform a given function or functions. Except where such substitution would not be operative, such substitution is within the intended scope of the embodiments.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art.

We claim:

1. An acoustic disdrometer, comprising
   an acoustic shell having a top surface and a bottom surface, wherein the bottom surface defines an acoustic chamber;
   a dead air chamber at least partially separated from the acoustic chamber by a physical barrier;
   a control unit; and
   a first acoustic transducer, wherein
      the first acoustic transducer is positioned within the acoustic chamber and configured to provide acoustic signals to the control unit in response to precipitation impacting the top surface of the acoustic shell.

2. The acoustic disdrometer of claim 1, further comprising a second acoustic transducer, wherein the acoustic transducer is configured to provide acoustic signals to the control unit.

3. The acoustic disdrometer of claim 2, wherein the control unit is to configured remove common mode noise from the acoustic signals provided by the first acoustic transducer based on the acoustic signals provided by the second acoustic transducer.

4. The acoustic disdrometer of claim 3, wherein the second acoustic transducer is positioned within the dead air chamber.

5. The acoustic disdrometer of claim 1, further comprising a port disposed between the acoustic chamber and the dead air chamber.

6. The acoustic disdrometer of claim 1, wherein the first acoustic transducer comprises a micro electro-mechanical system microphone.

7. The acoustic disdrometer of claim 1, wherein at least a portion of the acoustic shell is translucent.

8. The acoustic disdrometer of claim 7, further comprising a solar array, wherein the solar array is in electrical communication with the control unit.

9. The acoustic disdrometer of claim 8, wherein at least a portion of the physical barrier is the solar array.

10. The acoustic disdrometer of claim 9, wherein at least a portion of the solar array is positioned between the acoustic chamber and the dead air chamber.

11. The acoustic disdrometer of claim 1, wherein the top surface of the acoustic shell is planar.

12. The acoustic disdrometer of claim 1, wherein the top surface of the acoustic shell is domed shaped.

13. The acoustic disdrometer of claim 1, further comprising a printed circuit board, wherein at least a portion of the physical barrier comprises the printed circuit board.

14. An acoustic disdrometer, comprising
an acoustic shell having a top surface and a bottom surface, wherein at least a portion of the acoustic is translucent;
an acoustic chamber defined at least partially by the acoustic shell;
a control unit;
an acoustic transducer positioned within the acoustic chamber, wherein the acoustic transducer is configured to provide acoustic signals to the control unit in response to precipitation impacting the top surface of the acoustic shell; and
a solar array positioned within the acoustic chamber, wherein the solar array is in electrical communication with the control unit.

15. The acoustic disdrometer of claim 14, wherein the solar array surrounds the acoustic transducer.

16. The acoustic disdrometer of claim 14, wherein the acoustic transducer comprises a micro electro-mechanical system microphone.

17. A method of measuring precipitation, comprising:
receiving, by a control unit associated with an acoustic disdrometer, an acoustic signal generated by a primary acoustic transducer responsive to liquid or solid precipitation directly impacting at a plurality of locations across the surface area of acoustic shell of the acoustic disdrometer, wherein the liquid or solid precipitation directly impacting the acoustic shell comprises naturally varying individual drop sizes;
determining, by the control unit, an acoustic frequency (Hz) and an acoustic power (dB) of the acoustic signal corresponding to the individual drops of liquid or solid precipitation and
determining, by the control unit, a rate of precipitation based at least in part on frequency and acoustic power of the acoustic signal and the surface area of the acoustic shell.

18. The method of claim 17, further comprising:
determining, by the control unit, a diameter distribution of the precipitation based on a transfer function relating frequency and acoustic power to drop size.

19. The method of claim 17, wherein the rate of precipitation is based at least in part on the sum of a volume of droplets falling over a period of time.

20. The method of claim 17, further comprising:
determining, by the control unit, a radar reflectivity factor based at least in part on a sum of the droplet diameters.

21. The method of claim 17, further comprising:
receiving, by the control unit, an acoustic signal generated by a secondary acoustic transducer of the acoustic disdrometer; and
removing, by the control unit, common mode noise from the acoustic signal received from the primary acoustic transducer based on the second acoustic signal.

22. The method of claim 17, wherein the control unit is positioned within the acoustic disdrometer.

23. The method of claim 17, further comprising:
discriminating, by the control unit, liquid precipitation and solid precipitation based on distinguishing features of the acoustic frequency (Hz) and an acoustic power (dB) of the acoustic signal.

24. The method of claim 17, further comprising:
identifying, by the control unit, spurious acoustic signals based on distinguishing features of acoustic frequency (Hz) and an acoustic power (dB) of the acoustic signal, wherein the spurious acoustic signals are caused by any of machinery, voices, or wind.

25. The method of claim 17, further comprising:
receiving, by the control unit, an acoustic signal generated by a secondary acoustic transducer of the acoustic disdrometer; and
removing, by the control unit, common mode noise from the acoustic signal received from the primary acoustic transducer based on the second acoustic signal.

26. A method of measuring precipitation, comprising:
receiving, by a control unit associated with an acoustic disdrometer, an acoustic signal generated by a primary acoustic transducer responsive to individual drops of precipitation impacting an acoustic shell of the acoustic disdrometer, wherein the individual drops vary in drop size;
determining, by the control unit, an acoustic frequency (Hz) and an acoustic power (dB) of the acoustic signal corresponding to the individual drops of precipitation; and
determining, by the control unit, a rate of precipitation based at least in part on frequency and acoustic power of the acoustic signal.

27. The method of claim 26, wherein the rate of precipitation is based at least in part on the sum of a volume of droplets falling over a period of time.

28. The method of claim 26, further comprising:
discriminating, by the control unit, liquid precipitation and solid precipitation based on distinguishing features of the acoustic frequency (Hz) and an acoustic power (dB) of the acoustic signal.

29. The method of claim 26, further comprising:
identifying, by the control unit, spurious acoustic signals based on distinguishing features of acoustic frequency (Hz) and an acoustic power (dB) of the acoustic signal, wherein the spurious acoustic signals are caused by any of machinery, voices, or wind.

30. The method of claim 26, further comprising:
powering the control unit by a solar array.

* * * * *